July 2, 1957 — A. CAPPELLO — 2,797,740
PORTABLE SEAT
Filed Feb. 8, 1957 — 2 Sheets-Sheet 1

ALFRED CAPPELLO,
INVENTOR.

BY George R. Bliss

ATTORNEY

July 2, 1957 A. CAPPELLO 2,797,740
PORTABLE SEAT
Filed Feb. 8, 1957 2 Sheets-Sheet 2
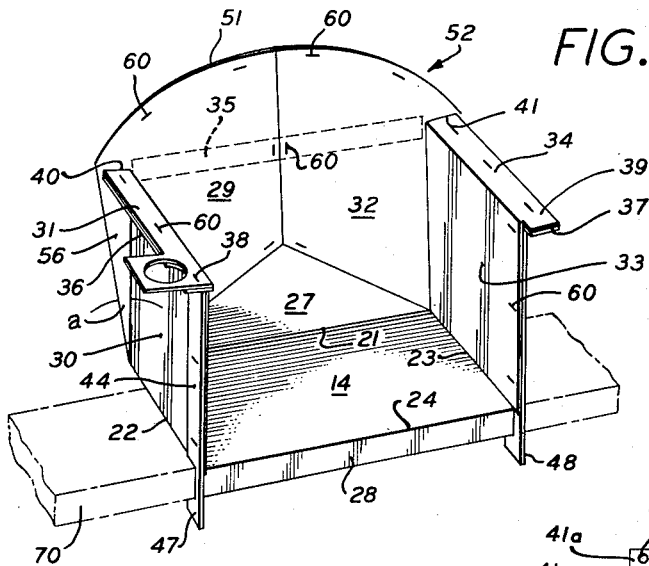
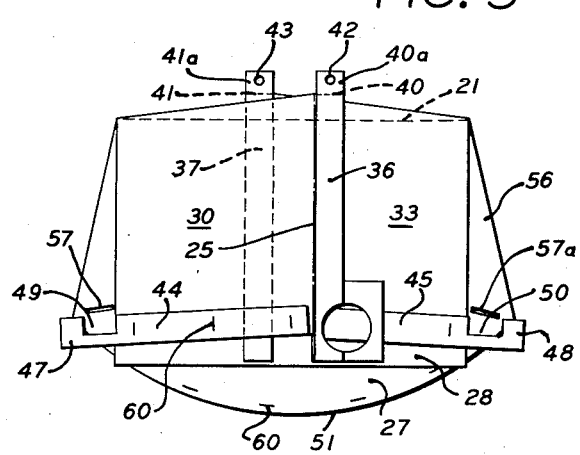
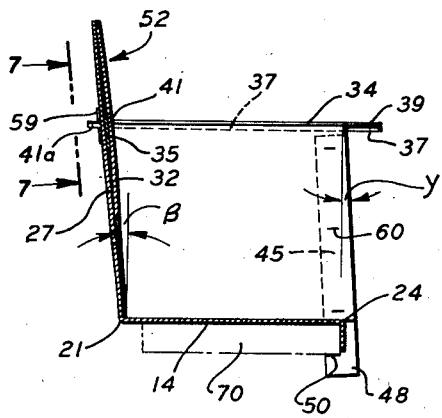
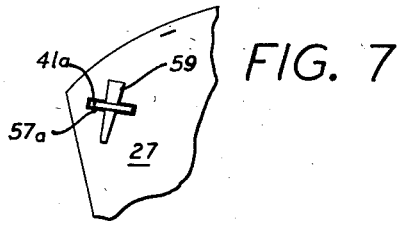
ALFRED CAPPELLO,
INVENTOR.
BY George R. Bliss,
ATTORNEY United States Patent Office 2,797,740
Patented July 2, 1957

2,797,740

PORTABLE SEAT

Alfred Cappello, North Hollywood, Calif.

Application February 8, 1957, Serial No. 639,163

9 Claims. (Cl. 155—133)

This invention relates to portable seats for placement on the boards or planks, which are used to provide seating benches in spectator stands, such as those of stadiums, arenas, and other such places of entertainment or education.

One of the object of this invention is to supply such a seat which is light in weight for ready transportation by the user either from his home or from the place of a seat rental business, and is also of strong and sturdy construction to withstand the stresses and wear and tear to which the seat is subjected in use and in transportation.

Another object is to provide the seat, which is preferably made of multiple layer corrugated paperboard, with re-enforcing strips, preferably of plyboard, in such relative position on the panels of the seat as to not only strengthen the material against general stresses, but to facilitate the design of a double leaved extra sturdy backrest, to facilitate the fastening of the collapsible panels into a solid assembly of relatively immovable panels, and to facilitate the securement against tilting or rearward movement of the assembled seat on a seating bench.

It is another object of the invention to provide a seat capable of being made from a one piece blank of sheeted material with no additional parts subject to loss or misplacement with the exception of two small assembling pins which may be secured to the seat at any convenient place thereon in a manner to permit their manipulation in the operation of assembling or disassembling the seat.

It is still another object to provide a seat which may be of inexpensive manufacturing cost, attractive in appearance, easily handled and comfortable in use.

In the drawings which are for illustrative purposes only:

Figure 4 is a perspective view of the seat assembled in utility form and secured in position on a bench seat of a spectator stand.

Figure 5 is an elevational view of the seat in collapsed position convenient for transportation by the user.

Figure 6 is vertical sectional view taken along the line 6—6 of Figure 4.

Figure 7 is a fragmentary view of the rear surface of the seat as indicated by the arrows 7—7 of Figure 6 illustrating the manner in which the seat is secured in assembled position.

Figure 3:
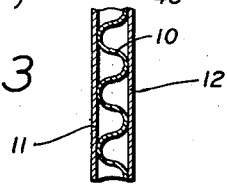
Figure 3 is sectional view showing the interior construction of the paperboard from which the blank is preferably made.

A seat embodying this invention is manufactured from a sheet of die-pressed paperboard, preferably of three plies or layers, as shown in cross section in Figure 3. The two surface layers 11 and 12 are smooth surfaced and between them is a corrugated layer 10 of paperboard of conventional design assembled in the well-known conventional manner to provide a sheet of what is popularly known as corrugated paperboard or cardboard. Because of its light weight, and resistance to bending stresses it is used as the basic material in the construction of a seat of this invention. As will presently appear this sheeted material is further strengthened by surface strips of plywood secured to it, where such reinforcement is most effective in resisting the stresses of tension, compression and flexure to which the parts of the seat are subjected in use.

Figure 1:
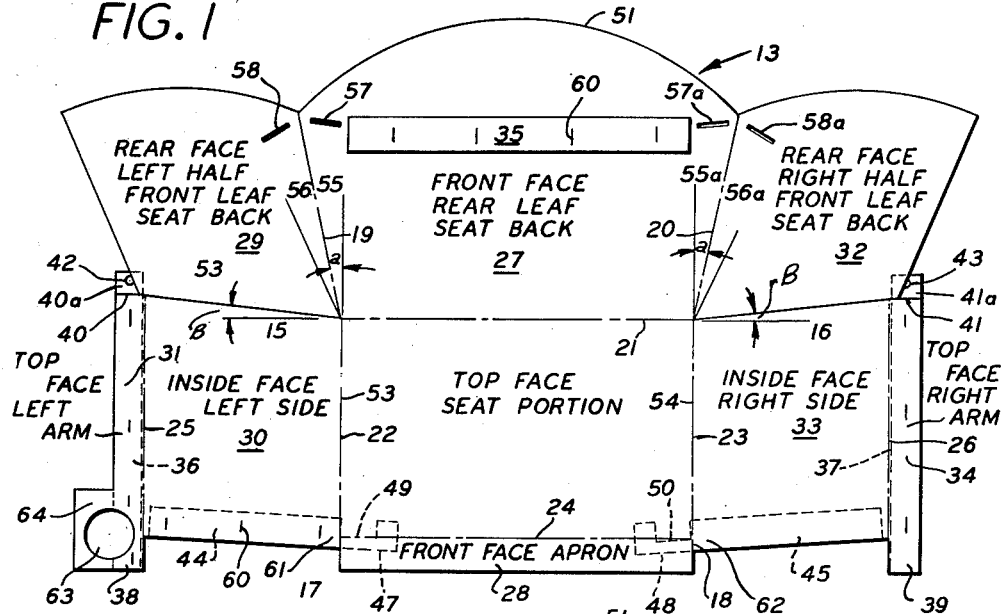
Figure 1 is a top plan view of a paperboard blank of a shape and character designed for the fabrication of a seat of this invention.
Figure 2:
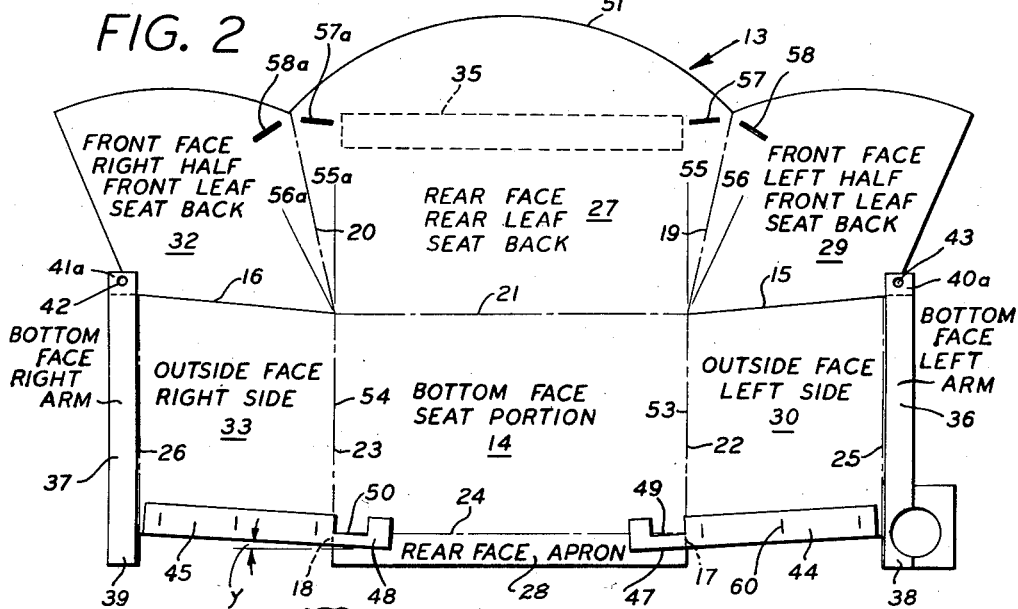
Figure 2 is a bottom plan view of the blank.

The blank 13 is formed in the shape shown in Figures 1 and 2 of the drawings. Figure 1 shows one side of the blank the several areas of which are each labelled with the name of the part of the seat which it will ultimately form at the termination of the manufacturing process, and with the name of the face of that part which shows in Figure 1. Figure 2 similarly shows the reverse side thereof. Thus the panel 14 is labelled "Seat portion top" on Figure 1 and "Seat portion bottom" on Figure 2 signifying that the panel area designated with the numeral 14 on Figure 1 will become the upper or top surface of the seat portion of the seat and that the panel area designated 14 on Figure 2 will become the lower or bottom surface of this same panel 14. The other panels are similarly designated.

The panels are delineated by severing the blank along the lines 15, 16, 17 and 18 and scoring it along the lines 19, 20, 21, 22, 23, 24, 25 and 26. There are thus formed the three central panels 27, 14 and 28, the three left hand panels 29, 30 and 31, and the three right hand panels 32, 33 and 34.

The panel 27 is re-enforced by securing across at least the major portion of its front surface (see Figure 1) a horizontally disposed strip 35 of plywood of suitable lightweight strong material. This strip of plywood is located preferably intermediate the upper and lower edges of panel 27 at a level so spaced between these edges that when the fabrication of the seat is completed it will be substantially at the level of the greatest horizontal pressure exerted by the back of a person against the back of the seat.

Similarly vertically disposed strips of plywood 36 and 37 are secured to the nether surfaces of the panels 31 and 34 respectively (see Figure 2) which will constitute the arms of the seat when the fabrication is completed. These strips 36 and 37 are preferably of approximately the same width as the panels to which they are secured, and extend longitudinally from the outer ends of these panels at 38 and 39 respectively, to and a short distance beyond the inner ends 40 and 41 of these panels. Apertures 42 and 43 are formed in the projecting inner ends 40a and 41a of these strips 36 and 37 respectively. The reason for the provision of these projecting ends 40a and 41a of the strips and the apertures therein will be later explained.

Two additional re-enforcing strips 44 and 45 of plywood are secured in horizontal position along the lower (as viewed in Figure 2) edges of the outside surfaces of panels 30 and 33 respectively extending in each case from a point adjacent the outer edge of the panel to and a short distance beyond the inner edge thereof. The inwardly projecting ends 47 and 48 of re-enforcing strips 44 and 45 are formed with upwardly opening rectangularly shaped cutouts 49 and 50 respectively, formed and located as shown in Figure 2. These cutout openings are of a length suitable for engagement with a seat board or bench of the thickness which customarily characterizes the boards, or benches used in sports arenas, baseball or other stands, or similar facilities for the seating of individuals of an audience or gathering of people. These reenforming strips 35, 36, 37, 44 and 45 are secured in any suitable manner to the corrugated paperboard blank, preferably by stapling, as indicated at 60, 60.

After the blank 13 is die-formed, cut and scored and the re-enforcing strips secured thereto the next and final steps in forming the seat from the blank 13 are those of inwardly and upwardly folding the panels 29 and 32 as seen in Figure 1, along the score lines 19 and 20 respectively and then of inwardly and downwardly folding them into contact with the two side portions of the panel 27, and then the securement, as by stapling, of these panels 29 and 32 to the re-enforcing strip 35 and also to the upper edge 51 of the panel 27. The severance lines 15 and 16 permit this operation. Panels 29 and 32 then become the two side portions of what functions as a front leaf or layer of the seat back assembly 52 of the seat of this invention. The rear leaf or layer of the seat back assembly is the panel 27. The re-enforcing strip stiffens and strengthens the seat back 52 against flexure.

It will be observed that in a seat of this character for attachment to a flat horizontal board or plank, the seat bottom lies on the board or plank, and does not require heavy construction or re-enforcement. The sides also are not subject to relatively heavy stresses. But the back of the seat must successfully resist the horizontally applied relatively heavy pressure of the occupant of the seat resulting from his weight or from his muscular exertion. In a seat of this invention the seat back is capable of resisting any ordinary degree of applied pressure, by reason of its two layer construction and its plywood re-enforcing strip between the layers. It is also strengthened by securement to the sides of the seat in a manner to appear later.

After the seat is thus completed in collapsible form it is arranged for use on each occasion of such use as follows. The left side panel 30 with its arm panel 31 is folded upwardly and inwardly on the score line 22 to a vertical position. The right side, panel 33 with its arm panel 34 is similarly folded to a vertical position. The seat sides are thus provided and because the score lines 22 and 23 are substantially perpendicular to the score line 21 the sides are both perpendicular to the seat panel 14 and parallel to each other. Since however the score lines 19 and 20 are at a small acute angle $\alpha$ to the vertical and to the inner edges 53 and 54 of the side panels 30 and 33, there will be provided small triangularly shaped imaginary sections 55, 55a, 56 and 56a, which project laterally from the two side edges of the seat back near leaf panel 27, and the two inner side edges of the seat back front leaf panels 29 and 32. When the side panels are brought to their vertical position, these sections will overlap and register 55 with 56 and 55a with 56a. Also, because the severance lines 15 and 16 are preferably at a small acute angle $\beta$ to the horizontal as seen in Figure 1, the seat back 52 is preferably caused to lean backwardly at a slight angle $\beta$ (see Fig. 6) to the seat portion 14 to afford additional comfort to the occupant of the seat, as is conventionally the case in seating facilities of many kinds.

The triangular sections 55, 55a, 56 and 56a are slotted at 57, 57a and 58, 58a, respectively. When the panels 29 and 32 are folded against panel 27, slots 57 and 57a, and slots 58 and 58a register to provide through openings in the seat back assembly 52. These openings are just large enough in width and length to receive the inner ends 40a and 41a of the re-enforcing strips 36 and 37 respectively. When the side panels 30 and 33 are folded to their vertical positions as described above, the arm panels 31 and 34 are folded on the score lines 25 and 26 to a horizontal position perpendicular to the side panels 30 and 33 to which they are attached. The arm re-enforcing plywood strips 36 and 37 also assume a horizontal position along with the arm panels to which they are attached. Their projecting ends 40a and 41a are then inserted respectively in the registering slots 57 and 58 on the left side of the seat back assembly, and in the registering slots 57a and 58a on the right side of the seat back assembly, and securely pinned against withdrawal from the slots by downwardly inserted tapering pins 59 and 59a respectively, Figs. 6, 7.

When the side panels are folded up to their vertical utility positions, the re-enforcing strips 44 and 45 project downwardly below the seat portion panel 14 and their cutouts 47 and 48 are so located that when the seat assembly is placed on the board or bench of a viewing stand or other such structure, and pushed transversely backwardly of the board or bench, the cutouts 47 and 48 fit over the front edge of the board or bench and both hold the seat vertically in place against tipping upwardly, and prevent the seat from sliding rearwardly. The narrow panel 28 is folded downwardly on the score line 24. It should be of sufficient width to cover the front of the board or bench of the stand and protect the clothing of the occupant of the seat from damage or soiling, and prevent the catching of clothing between the board or bench and the seat bottom panel 14.

In order that the clothing-protecting, depending panel 28 shall be in flat contact with the front edge of the bench or board of the stand so that the panel 28 may not become deformed in use, the strips 44 and 45 must be at a slight acute angle $\gamma$ to the vertical so as to advance the cutouts 49 and 50 in proper position of engagement with the front edge faces of the bench or board. The front edges of the side panels must then also be at a slight acute angle with the vertical to provide these front edges with the protection of these strips. Accordingly the triangular areas 61 and 62 must be provided which is accomplished by severing the blank 13 at the short severance lines 17 and 18, beginning at the score line 24 and extending forwardly a short distance, allowing the depending panel 28 to be bent downwardly at the score line 24 and having it snugly engage the front edge face of the board or bench 70 of the stand.

If desired one of the arm panels 31 and 34, preferably the left panel 31 as shown on the drawing, which is the right panel from the standpoint of the occupant, may be provided with a widened area 64 at its front end, which is formed with a circular cutout 63 for holding a drinking vessel.

The upper edges of the panels 27, 29 and 32 are preferably rounded for ornamentation so as to provide a seat back assembly of greater height relatively to the sides.

It will be observed that the back, seat portion and sides of the seat of this invention are all framed around their edges with sturdy re-enforcing elements. The seat back assembly has two protecting edges along its top, and a bead like fold 65 at each of its side edges. Its bottom edge is stiffened by the integral junction with the seat bottom. Horizontally acting stresses on the seat back are taken up by the plywood strips 36 and 37 and by the side panels 30 and 33. Each side panel is protected by the re-enforced arm at its upper edge, by the integral junction with the seat bottom panel at its lower edge, by abutment with the laterally projecting double leaved seat back at its rear edge, and by the flushly alined re-enforcing strips 44 and 45 at its front edge. The seat bottom panel 14 rests solidly on the board or bench of the stand, and is protected from damage at its front edge by the integrally connected depending panel 28, and by its integrally formed junction with the sides and back of the seat.

It is light and easy to carry. It may be arranged compactly for shipment or for carrying to and from places of use, by folding the seat back assembly 52 backwardly against the bottom face of the seat portion 14 and folding the sides inwardly against the upper face of the seat portion 14, see Fig. 5. It will be noticed that the complete fabricated seat, whether folded for shipment or arranged in utility position, consists of a single one piece article plus two small pins which may be permanently secured to the one piece article by some form of flexible fastener to permit the insertion and removal of the pins without loss or misplacement.

If desired the two panels 29 and 32 may be folded against the rear face of the seat back panel 27 to form the seat back assembly. In that case the re-enforcing strip 35 would be secured to the rear face of the panel 27 instead of the front face as shown in the drawings.

Other variations in arrangement and shape of the several elements of the seat of this invention may be made without departing from the principle and spirit of the invention. The invention is described and defined in the following claims.

I claim:

1. A blank for the manufacture of a collapsible seat suitable for placement upon a seating bench of a spectator stand, consisting of a single piece of lightweight paperboard bendable along score lines and capable of initially lying in a single plane, said piece having inner longitudinal first and second score lines, intermediate longitudinal straight third and fourth score lines disposed outside of said first and second lines, and a transverse fifth score line crossing and intersecting said first and second lines intermediate their ends, said fifth line continuing as severance cuts beyond said intersections toward the ends of said third and fourth lines and to terminal points adjacent the third and fourth lines respectively, said first and second lines on a first side of said fifth line being substantially parallel and said third and fourth lines on the said first side of said fifth line being substantially parallel to each other and to the first and second lines, providing a plurality of single-plane panels, viz., a seat portion first panel between the parallel portions of the first and second lines, two side second and third panels each being disposed between the said first panel parallel-portion lines and the corresponding parallel portions of the third and fourth lines respectively, a fourth panel between and bounded on its two sides by the first and second lines on the second side of said fifth line, a fifth and a sixth panel, each extending outwardly from the said two sides of the fourth panel respectively and bounded on its inner end edge by one of the said cut portions of the fifth line respectively, and elongated narrow seventh and eighth panels extending outwardly from substantially the entire length of the third and fourth lines respectively, each of said lines which passes through one of said intersections being straight from the intersection to its other end.

2. The subject matter defined in claim 1, in which the portions of the first and second score lines on the second side of the fifth line are at a small acute angle to the portions thereof on the first side of the fifth line.

3. The subject matter defined in claim 2 in which the fifth panel is bounded in clockwise order, by the said first line, by the said fifth line, by an outer side edge straight line, and by an outer end edge arcuate line, and the sixth panel is similarly symmetrically bounded and shaped, the fourth panel is bounded at its outer end edge by an arc centered on the center line of said fourth panel, said arc being of the same radius as the arcuate outer end edges of the fifth and sixth panels, the shape of the fifth and sixth panels being such that they are capable of being folded over on lines 1 and 2 respectively to lie flat on the fourth panel with their said outer side edges abutting each other in registry with the center line of the fourth panel, and their arcuate end edges in registry with said outer end edge of the fourth panel, the said fourth, fifth and sixth panels thus being adapted to form a back seat assembly.

4. The subject matter defined in claim 3, in which the said severance cut lines are cut continuations of the fifth line, and are each at a slight acute angle with the central portion of the fifth line diverging away from the body of the second and third panels respectively.

5. The subject matter defined in claim 1, and in addition thereto a strip of plyboard secured in transverse position across at least a major portion of the fourth panel intermediate the inner and outer end edges thereof.

6. The subject matter defined in claim 3 and in addition thereto a strip of plyboard on the underface of each of the fifth and sixth panels, each strip extending rearwardly a short distance beyond the fifth line, and each such extension being provided at its rearward end with a small aperture, and the fourth, fifth and sixth panels being provided with small slot shaped apertures located to register to provide two through apertures when the fifth and sixth panels are folded over upon the fourth panel, and to provide said through apertures in such locations that the said extensions registeringly enter said through apertures when the second and third panels are folded upwardly to a vertical position to form the sides of the seat, and when the seventh and eighth panels are folded downwardly from the second and third panels respectively to horizontal position to form arm rests for the sides of the seat, the said extensions being capable of moving through said through apertures to a home position in which the rear edges of the second and third panels respectively abut the forward face of the back rest assembly, and in which the apertures are each adapted to receive a fastening pin disposed to the rear of and in substantially sliding contact with the rear face of the back rest assembly.

7. The subject matter defined in claim 5, in which the fifth and sixth panels are folded over upon the fourth panel and against the said plyboard strip and secured to the fourth panel and its plyboard strip, to form a back rest assembly.

8. The subject matter defined in claim 1, and in addition thereto a strip of plyboard secured along the underside of the forward edge portion of each of the side second and third panels with its forward edge substantially flush with the forward edge of the side panel, and its inwardly directed end projecting a short distance beyond the adjacent one of the first and second lines, said projecting end being formed with an inwardly opening channel shaped cutout of a length and breadth adapted to engage and slide rearwardly transversely over a seating bench of a spectator stand to a home position in which the bottom face of the cutout abuts the front face of the bench, when the side panels are folded upwardly to a vertical utility position, and further in which there is provided on the blank a narrow horizontally elongated ninth panel integrally extending forwardly from the front edge boundary line of the first panel, said front edge boundary line being a score line about which the ninth panel can be folded downwardly to a vertical position and lie against the front face of a bench seat behind it, and the front boundary lines of each of the second and third panels being continuous with said last mentioned score line and inclined rearwardly at a slight angle to said score line as the blank lies flat in horizontal position.

9. A blank for the manufacture of a collapsible seat suitable for placement upon a seating bench of a spectator stand, consisting of a single flat piece of lightweight paperboard bendable along score lines and capable of initially lying in a single plane, said piece having two straight line severance cuts, the adjacent edges of said cuts being in abutting relationship with each other, and the said piece also being scored along a plurality of straight lines, for bending to provide by said bending and by reason of said cuts, a plurality of panels each lying in a separate and different plane, and each having all straight line junctions with adjacent ones of said plurality of panels along said cuts and score lines, as follows (1), a horizontal central seat portion first panel; (2 and 3), two side second and third panels, each with one of its inner side edges integrally contiguous with the adjacent side of the seat portion first panel; (4), a fourth panel which is adapted to constitute the first leaf of a two leaved upright seat back, said fourth panel being a rearward integral continuation of the seat portion panel; (5 and 6), and fifth and sixth panels, which are adapted to constitute the second leaf of said upright seat back, each of said fifth and sixth panels being a lateral integral continuation at its initially inner (before folding) side edge of the fourth panel at one of the two opposite side edges of said fourth panel, and each of said fifth and sixth panels further being a rearward continuation of one of the two side second and third panels, but being severed therefrom respectively by one of said cuts at the junction line with said side panel, each of the said fifth and sixth panels being shaped and dimensioned similarly to the other one of the fifth and sixth panels, and so as to have the two (initially) outer side edges of said fifth and sixth panels respectively, when said panels are folded about their (initially) inner side edges meet along a vertical center line of the fourth panel (first leaf of the seat back), and so as to lie adjacent to and substantially parallel to said fourth panel, and the said cut edges of said fifth and sixth panels then constituting the lower boundary line of said second leaf of the seat back.

References Cited in the file of this patent

UNITED STATES PATENTS

| | | |
|---|---|---|
| 1,831,428 | Sherman | Nov. 10, 1931 |
| 2,244,605 | Benoit | June 3, 1941 |
| 2,748,927 | Crane | June 5, 1956 |
| 2,759,527 | Myrick | Aug. 21, 1956 |